United States Patent Office 2,789,053

Patented Apr. 16, 1957

2,789,053

PHOTOGRAPHIC PROCESS USING A LIGHT SENSITIVE RESIN COMPOSITION

Stanley B. Elliott, Cleveland, Ohio, assignor to Ferro Corporation, Cleveland, Ohio, a corporation of Ohio No Drawing. Application May 11, 1953, Serial No. 354,414

4 Claims. (Cl. 96—27)

This invention relates as indicated to a new composition of matter and has more particular reference to photosensitive polymeric materials and method of making same.

It is well known to those skilled in the art that the formation of images in photosensitive compositions is dependent upon the degeneration of silver salts therein. In the photosensitive systems of the present invention the formation of images is not dependent upon the degeneration of silver salts as in the prior art, but is dependent upon the degradation of polymeric materials which materials in the presence of Friedel-Crafts catalysts are degraded by the action of heat and/or light so as to form unsaturated structures rather than reverting to a monomeric structure.

Therefore, it is a principal object of this invention to provide a new composition of matter comprising a polymeric material which is photosensitive to actinic light.

Another object of this invention is to provide a photosensitive system which can be "developed" and "fixed" by light and heat alone.

Other objects will appear as the description proceeds.

To the accomplishment of the foregoing and related ends the invention then comprises the features hereinafter fully described and pointed out in the claims, the following description setting forth in detail certain illustrative embodiments of the invention, these being indicative, however, of but a few ways in which the principle of the invention may be employed.

Broadly stated this invention comprises a new composition of matter consisting essentially of an intimate admixture of:

(*a*) A polymeric material which in the presence of a Friedel-Crafts type catalyst is able at elevated temperatures to undergo degradation with the formation of chromophore groups;

(*b*) A minor amount of a substance selected from the class consisting essentially of Friedel-Crafts type catalysts and Friedel-Crafts type catalyst cation progenitors; and (*c*) A minor amount of a Friedel-Crafts anion progenitor which comprises a halogenated organic compound having a boiling point not less than 150° F. and which in the presence of actinic light will degrade and release halogen acid.

Since the compositions and processes of the present invention are different than ordinarily encountered by those skilled in the art of photosensitive materials the following definitions are offered so as to avoid any confusion that might arise:

*Exposure.*—The treatment of the photosensitive composition under an actinic light source to produce a latent image.

*Development.*—The heat treatment of the light exposed photosensitive composition so as to make the latent image apparent.

*Latent image.*—The area exposed to an actinic light source.

*Image.*—The area exposed to the actinic light and then developed by the action of heat.

*Ground.*—The undeveloped area around the image.

*Safety factor.*—The time between the appearance of the image and the darkening of the ground during the development operation.

*Actinic light.*—The term actinic light as used in the present invention is meant to include any electro-magnetic wave in the range of X-ray up to infra-red.

In the foregoing broad statement the basic component (*a*) of the composition has been defined as a polymeric material which in the presence of a Friedel-Crafts type catalyst at elevated temperatures is able to undergo degradation with the formation of chromophore groups. I have found that any polymeric material which does not revert to its monomeric form can be degraded by the present process to form its own chromophore groups.

Low molecular weight polymers, although they may not have film forming properties, may be employed if absorbed into absorbent bodies such as wood, paper, fabric, etc.

Thus the following broad classes of polymeric materials are typical of the substances which are applicable to the present invention:

Polyvinyl acetate
Polyvinyl alcohol
Ethyl cellulose
Cellulose acetate
Alkyd resins
Polyamides
Methacrylate polymers
Cellulose (paper and cloth)

It is to be noted that the various genera of polymeric materials which fall under the above mentioned broad classes are meant to be included as materials which are applicable to the present invention.

In the broad statement of the invention, component (*b*) has been defined as a Friedel-Crafts type catalyst or a Friedel-Crafts type catalyst progenitor which in the presence of heat promotes the degeneration of component (*a*). The materials which are used for this purpose are not required in stoichiometric amounts to combine with component (*a*), consequently component (*b*) serves catalytically to promote the degeneration of component (*a*).

As is well-known to those skilled in the art, that while aluminum chloride is the best known of the Friedel-Crafts type catalysts many other metal halides are also known and used as Friedel-Crafts type catalysts. Among those that may be listed as the more important Friedel-Crafts type catalysts are the halides of iron, antimony, zinc, tin, titanium, zirconium, beryllium, boron, cadmium and bismuth. Therefore, the halides of any of the foregoing metals will be useful in the compositions of the present invention.

While the above mentioned Friedel-Crafts type catalysts are useful in the present invention, in the preferred embodiment of this invention it is desirable to use what is known as Friedel-Crafts type cation progenitors. The Friedel-Crafts cation progenitors are any organic or inorganic salts which contain, for example any of the above mentioned cations and which in the presence of halide ions will form Friedel-Crafts type catalysts by reaction with the halide ions. The following Friedel-Crafts cation progenitor compounds are illustrative of materials which have been found to be especially useful in the present invention:

| | |
|---|---|
| Zinc acetate | Zinc oleate |
| Zinc laurate | Zinc 2-ethyl hexoate |
| Zinc napthenate | Zinc oxide |
| Zinc stearate | Zinc sulfate |

| | |
|---|---|
| Zinc sulfide | Aluminum acetate |
| Cadmium acetate | Aluminum chlorolaurate |
| Cadmium oxide | Bismuth naphthenate |
| Cadmium naphthenate | Antimony naphthenate |
| Cadmium stearate | Beryllium stearate |
| Cadmium sulfate | Iron naphthenate |
| Cadmium laurate | Iron oleate |

The Friedel-Crafts cation progenitors are preferred since with their use it is possible to control the color differential (safety factor) between the image and the ground during the development operation. When the polymeric material (component *a*) is intimately admixed with a catalyst cation progenitor (component *b*) and a catalyst anion progenitor (component *c*) and then exposed to actinic light, component (*c*) undergoes dehydrohalogenation and the released halide ions react with the surrounding cation progenitor to form a Friedel-Crafts type catalyst. Thus there is formed, in the light struck area, the Friedel-Crafts type catalyst, while the surrounding non-light exposed area contains only the cation progenitor. Then when the composition is subjected to the heat development operation, the light struck area undergoes very rapid degradation due to the presence of the Friedel-Crafts catalyst while the non-light struck area remains relatively colorless until the cation progenitor is converted to the active catalyst. However, the heating is stopped before the cation progenitor is converted to the active catalyst in sufficient concentration to cause the formation of chromophore groups and thus the resultant image is distinct from the ground.

The concentration of the Friedel-Crafts type catalyst or the Friedel-Crafts cation progenitor may vary from about 0.1 part per 20 parts of polymer to about 20 parts per 20 parts of polymer.

Component (*c*) as previously mentioned in the aforegoing broad statement is any organic halogenated compound which has a boiling point not less than 150° F. and which degrades in the presence of actinic light to release halide ions, or in other words Friedel-Crafts anions. Thus when the photosensitive systems of the present invention are exposed to actinic light the Friedel-Crafts anion progenitor degrades to release halide ions. These halide ions in turn react with the Friedel-Crafts cation progenitors to form Friedel-Crafts type catalysts. The thus formed catalysts then catalyze the formation of chromophore groups in the polymeric material during the heat development operation.

Thus compounds of high light instability or halogen acid instability, which may or may not give color in themselves, are used as the source of halogen acid for conversion of a Friedel-Crafts cation progenitor to a Friedel-Crafts type catalyst. Such materials as chlorinated paraffins, chlorinated rubber, alpha chlorostyrene and beta chlorostyrene readily release their halogens when exposed to actinic light and are thus particularly useful in the present invention.

The following materials are illustrative of the types of organic compounds which serve as Friedel-Crafts anion progenitors.

Parachlor benzaldehyde
Dichloropropylene
Hexachloroethane
Trichloroethane
Octachloropropane
Alphachlor acrylic acid
Halogenated vegetable oils (linseed, cottonseed, soyabean)
Halogenated rubber
Halogenated paraffins
Tetraiodoethane
Halogenated fatty acids (stearic, lauric)

The ratio of Friedel-Crafts anion progenitor may vary from about 0.5 part per 20 parts of polymer to about 20 parts per 20 parts of polymer.

The following examples are offered to illustrate the foregoing discussion.

I 20 grams ethyl cellulose
60 grams benzene
20 grams alcohol
5 grams chlorinated paraffin
5 grams zinc naphthenate The components of the above formulation were thoroughly mixed until a smooth solution was obtained and then films were drawn down on panels and allowed to air dry. The dried films were then covered with a photographic negative and exposed for about 2 minutes to an actinic light source of 120 milliwatts per square centimeter of surface. The exposed film was then heated for about 20 minutes at 300° F. The finished film was a clear and exact positive of the negative.

The aforegoing Example I uses an exposure of about 2 minutes to an actinic light source of 120 milliwatts per square centimeter of surface, it is to be understood that this exposure is only illustrative of how the photosensitive systems may be exposed. It is well known to those skilled in the art that resin monomers may be completely polymerized by additional polymerization to large size polymers within a period of 1 thousandth of a second. It is also well known degradation will take place under that same span of time with suitable conditions. These polymerizations and degradations can be actively initiated by very small quantities of energy. It is, therefore, entirely within the contemplation of this invention to produce latent images in my photosensitive systems using an exposure time of 1 thousandth of a second with an actinic light source on the order of two milliwatts per square centimeter of exposed surface.

The exposure of the photosensitive systems of this invention may be carried out under any source of electromagnetic waves in the range of X-ray up to infra-red.

The development of the latent image may be carried out in a temperature range of from about 200° F. to about 500° F. for about 1 to about 60 minutes.

The following examples are used to illustrate various formulations using different components *a*, *b* and *c*. All of these formulations produced exact positives of the negative which was used to mask the film. The possible combinations of the various components *a*, *b* and *c* are innumerable. Therefore, it is to be remembered that the examples given herein are only illustrative of the many possible ones.

II 20 grams cellulose acetate
80 grams butyl acetate
10 grams Chlorinated paraffin
5 grams Zinc oxide

III 20 grams alkyd resin
80 grams mineral spirits
5 grams chlorinated paraffin
5 grams zinc naphthenate

IV 20 grams polyvinyl acetate
80 grams butyl acetate
3 grams halogenated linseed oil
10 grams cadmium naphthenate

V 20 grams polyvinyl alcohol
80 grams alcohol
5 grams chlorinated rubber
5 grams aluminum chlorolaurate

VI 50 grams mineral spirits
5 grams chlorinated paraffin
5 grams zinc naphthenate A solution of the chlorinated paraffin and zinc naphthenate was made in the mineral spirits and used to treat paper. The resulting dried, treated paper contained 5 parts of chlorinated paraffin and 5 parts of zinc naphthenate per 50 parts of paper. The treated paper was then masked, exposed to actinic light and finally heat developed, resulting in an image in the paper.

In instances where resinous materials are used as the polymeric material (component *a*), plasticizers may be used if desired. The choice and amount of plasticizer is substantially dependent upon the physical properties desired in the final film.

It will be noted that in all of the foregoing examples various types of solvents are used. The ratio of solvent to polymeric material is not critical in the formulations of this invention. The amount and type of solvents disclosed herein were employed merely for ease of obtaining smooth films which would readily air dry. Thus, the amount and type of solvent used is dependent upon the solubility of the polymeric material and the desired viscosity of the resulting solutions.

In order for the photosensitive systems of the present invention to function it is necessary that the several components of the system be thoroughly and uniformly admixed. Several possible methods of accomplishing this are as follows:

(*a*) If the catalytic agents are soluble in the system they may be added directly to the other components and mixed by mechanical agitation.

(*b*) The catalytic agents, if insoluble in the composition, may be mixed and ground into the composition on a three roll paint mill or other similar type mill.

(*c*) The catalytic agents may be dissolved in any suitable liquid. If the polymeric material is a resinous film or a cellulosic sheet the solution of the catalytic agents may then be deposited on the surface thereof and allowed to soak down, thus allowing the catalytic agents to come into intimate contact with the particles of the polymeric material and then form a photosensitive film or sheet.

The photosensitive systems of this invention can be further modified by the additon of (*a*) agents which increase or amplify color of the light struck areas, and (*b*) agents which improve the reproduction of half-tones.

(*a*) To increase or amplify the color of the light struck areas, an acid-base sensitive dye (indicator) soluble or dispersible in the system may be added. For example, if crystal violet indicator is added to the formula of Example I the surplus halogen acid or acid acting salt will then cause the typical indicator color change in the light struck area when the total acidity of the system reaches the proper level.

(*b*) Chemical or physical barriers within the systems described will aid in controlling extensive degradation of the systems. The migration of hydrogen halides and Friedel-Crafts catalytically active molecules are controlled by these spacers or barriers and thus limit the degradation of the polymeric material substantially to those areas actually exposed to the actinic light source.

The following examples will serve to illustrate various formulations using physical barriers which improve halftone reproductions in the photosensitive systems previously disclosed.

VII 20 grams ethyl cellulose
60 grams benzene
20 grams alcohol
5 grams chlorinated paraffin
5 grams zinc naphthenate
20 grams talc

VIII 20 grams alkyd resin
80 grams mineral spirits
5 grams chlorinated paraffin
5 grams zinc naphthenate
20 grams diatomaceous earth

IX 20 grams polyvinyl acetate
80 grams butyl acetate
3 grams halogenated linseed oil
10 grams cadmium naphthenate
20 grams titanium dioxide Any finely divided inert solid particles, such as, mica, talc, silica, diatomaceous earth and titanium dioxide may be used in amounts varying from about 1% to about 50% of the weight of the polymeric material, as "physical barriers" or "spacers" to improve the production of halftones in the photosensitive compositions herein disclosed.

Active pigments, such as, calcium carbonate, basic lead sulfate, etc. may be used as "chemical spacers" in the aforegoing compositions to improve the production of half-tones. For example, in a system such as disclosed in Example VII calcium carbonate may be substituted for the talc. Any halogen acid liberated during development which does not react with the cation catalyst progenitor, will be taken up by chemical reaction with the calcium carbonate, thus preventing the chain reaction from one polymeric particle to another. The "chemical spacers" may be used in the same amounts as the aforegoing "physical spacers."

Other modes of applying the principle of the invention may be employed provided the features stated in any of the following claims or the equivalent of such be employed.

I, therefore, particularly point out and claim as my invention:

1. The process of making photographic images which consists of selectively exposing a photosensitive film to a light image in such a manner so as to create a light intensity gradient such that the area receiving maximum actinic light is exposed to about two milliwatts per square centimeter for one-thousandth of a second, said photosentive film consisting of an intimate admixture of: (*a*) A polymeric material selected from the class consisting of halogen free vinyl resins and halogen free cellulose resins; (*b*) From about 0.1 part per 20 parts of said polymeric material to about 20 parts per 20 parts of polymeric material of a substance selected from the class consisting of oxides of zinc and cadmium, metal salts of inorganic acids, and metal salts of carboxylic acids, the metals therein being selected from the class consisting of aluminum, iron, antimony, zinc, tin, titanium, zirconium, beryllium, cadmium and bismuth; and (*c*) From about 0.5 part per 20 parts of said polymeric material to about 20 parts per 20 parts of polymeric material of a material having high light instability and a boiling pont not less than 150° F. selected from the class consisting of saturated aliphatic branch-chain halogenated hydrocarbons, halogenated long chain aliphatic carboxylic acids, esters of long chain aliphatic haleogenated carboxylic acids, halogen containing aromatic aldehydes, halogen containing olefines, and halogenated styrene compounds and thereafter fully developing and the fixing the image solely by submitting said system to a temperature from about 200° F. to about 500° F. for a period of from about 1 to about 60 minutes.

2. The process of making photographic images which consists of selectively exposing a photosensitive film to a light image in such a manner so as to create a light intensity gradient such that the area receiving maximum actinic light is exposed to about two milliwatts per square centimeter for one-thousandth of a second, said photosensitive film consisting of an intimate admixture of: (*a*) A polymeric material selected from the class consisting of halogen free vinyl resins and halogen free cellulose resins; (*b*) From about 0.1 part per 20 parts of said polymeric material to about 20 parts per 20 parts of polymeric material of a substance selected from the class consisting of oxides of zinc and cadmium, metal salts of inorganic acids, and metal salts of carboxylic acids, the metals therein being selected from the class consisting of aluminum, iron, antimony, zinc, tin, titanium, zirconium, beryllium, cadmium and bismuth; (*c*) From about 0.5 part per 20 parts of said polymeric material to about 20 parts per 20 parts of polymeric material of a material having a high light instability and a boiling point not less than 150° F. selected from the class consisting of saturated aliphatic branch-chain halogenated hydrocarbons, halogenated long chain aliphatic carboxylic acids, esters of long chain aliphatic halogenated carboxylic acids, halogen containing aromatic aldehydes, halogen containing olefines and halogenated styrene compounds; and (*d*) From about 1% to about 50% of the weight of said polymeric material of a finely divided material selected from the class consisting of talc, mica, silica, diatomaceous earth, titanium dioxide, calcium carbonate, and basic lead sulfate, and thereafter fully developing and fixing the image solely by submitting said system to a temperature of from about 200° F. to about 500° F. for a period from about 1 to about 60 minutes.

3. The process of making photographic images which consists of selectively exposing a photosensitive film to a light image in such a manner so as to create a light intensity gradient such that the area receiving maximum actinic light is exposed to about two milliwatts per square centimeter for one-thousandth of a second, said photosensitive film consisting of an intimate admixture of: (*a*) Polyvinyl acetate; (*b*) From about 0.1 part per 20 parts of polyvinyl acetate to about 20 parts per 20 parts of polyvinyl acetate of zinc oxide; and (*c*) From about 0.5 part per 20 parts of said polyvinyl acetate to about 20 parts per 20 parts of polyvinyl acetate of chlorinated paraffin, and thereafter fully developing and fixing the image solely by submitting said system to a temperature from about 200° F. to about 500° F. for a period of from about 1 to about 60 minutes.

4. The process of making photographic images which consists of selectively exposing a photosensitive film to a light image in such a manner so as to create a light intensity gradient such that the area receiving maximum actinic light is exposed to about two milliwatts per square centimeter for one-thousandth of a second, said photosensitive film consisting of an intimate admixture of: (*a*) Polyvinyl acetate; (*b*) From about 0.1 part per 20 parts of said polyvinyl acetate to about 20 parts per 20 parts of polyvinyl acetate of zinc oxide; (*c*) From about 0.5 part per 20 parts of polyvinyl acetate to about 20 parts per 20 parts of polyvinyl acetate of chlorinated paraffins; and (*d*) From about 1% to about 50% of the weight of said polyvinyl acetate of titanium dioxide, and thereafter fully developing and fixing the image solely by submitting said system to a temperature of from about 200° F. to about 500° F. for a period of from about 1 to about 60 minutes.

References Cited in the file of this patent

UNITED STATES PATENTS

| | | |
|---|---|---|
| 1,587,274 | Beebe et al. | June 1, 1926 |
| 2,099,297 | Clement | Nov. 16, 1937 |
| 2,463,983 | Leatherman | Mar. 8, 1949 |
| 2,475,626 | Leatherman | July 12, 1949 |
| 2,560,164 | Garber | July 10, 1951 |
| 2,599,581 | Perkins et al. | June 10, 1952 |
| 2,653,920 | Harford | Sept. 29, 1953 |

OTHER REFERENCES

Diamond Chlorowax Handbook, Diamond Alkali Co., 1951, pp. 21 and 65. (Copy in Division 50.)